Sept. 15, 1942.   J. B. HANDLEY   2,296,104
EASY READING SCALE RULE AND THE LIKE
Filed Jan. 12, 1942   3 Sheets-Sheet 1
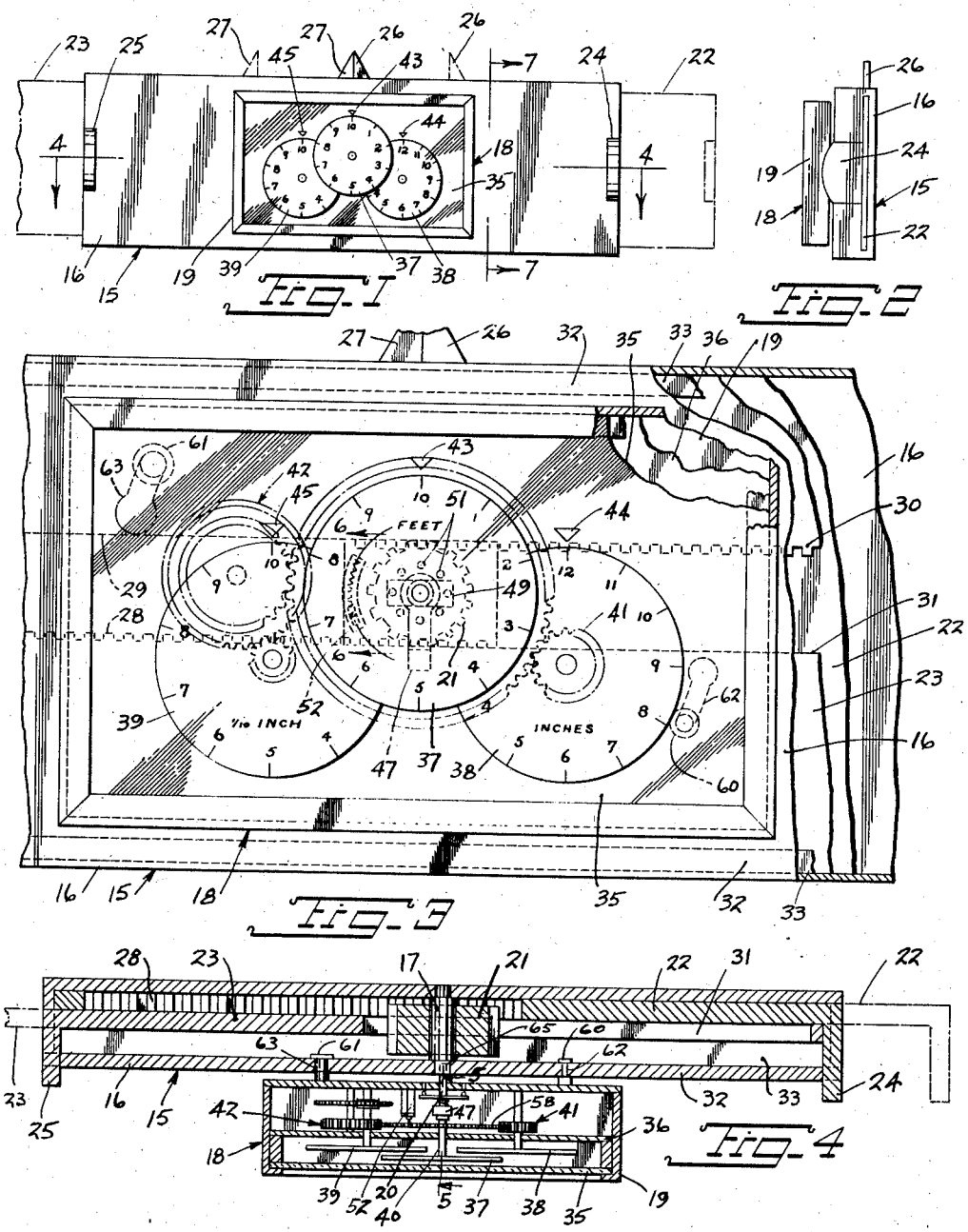
INVENTOR.
JOHN B. HANDLEY
BY
ATTORNEY Sept. 15, 1942.    J. B. HANDLEY    2,296,104
EASY READING SCALE RULE AND THE LIKE
Filed Jan. 12, 1942    3 Sheets-Sheet 2
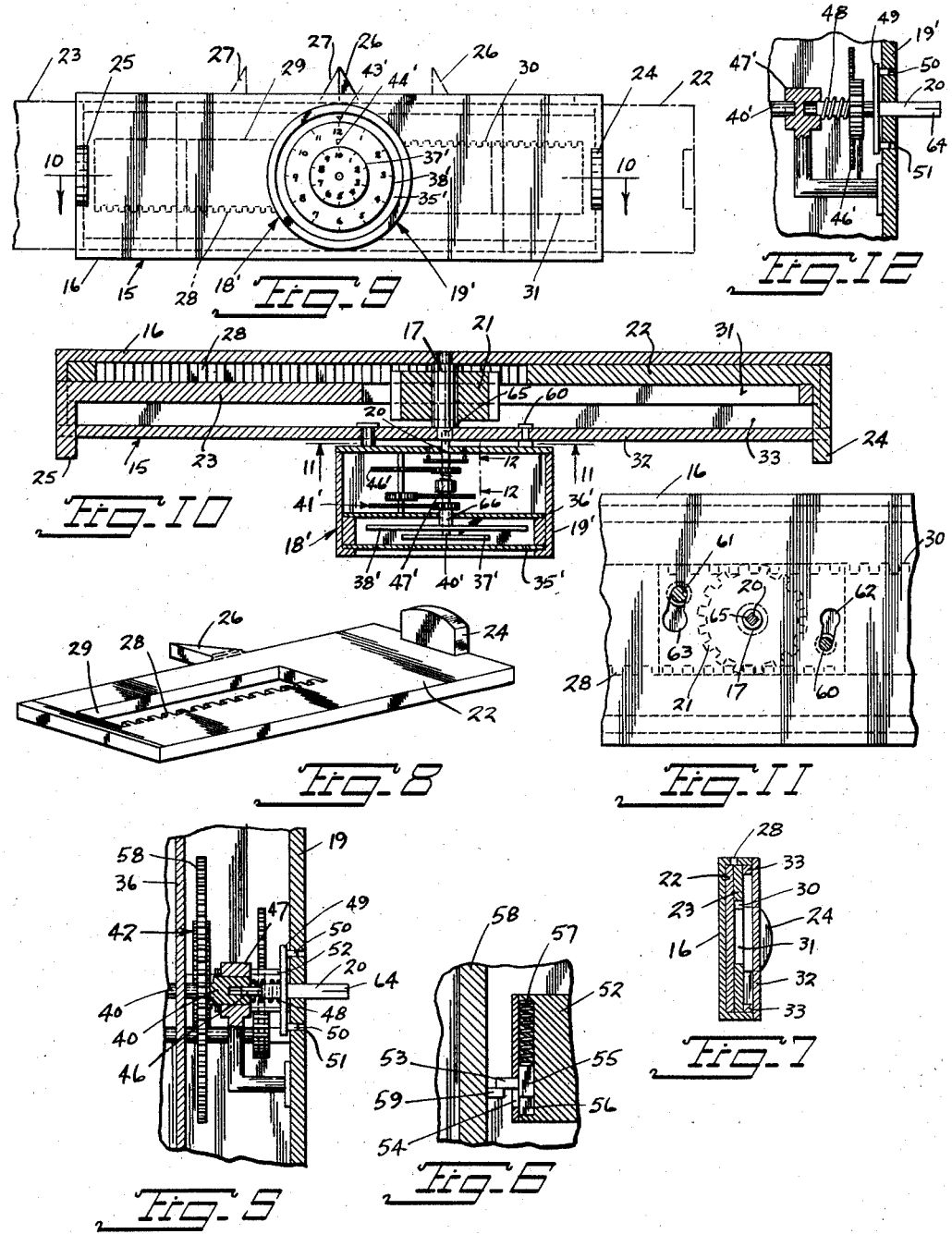
INVENTOR.
JOHN B. HANDLEY
BY
ATTORNEY.

Sept. 15, 1942.  J. B. HANDLEY  2,296,104
EASY READING SCALE RULE AND THE LIKE
Filed Jan. 12, 1942  3 Sheets-Sheet 3

INVENTOR.
JOHN B. HANDLEY
BY
ATTORNEY.

Patented Sept. 15, 1942

2,296,104

UNITED STATES PATENT OFFICE 2,296,104

EASY READING SCALE RULE AND THE LIKE

John B. Handley, Albany, N. Y.

Application January 12, 1942, Serial No. 426,395

11 Claims. (Cl. 33—125)

This invention relates to new and useful improvements in easy reading scale rules and the like.

The invention is particularly intended to facilitate the scaling of distances on drawings which are drawn to ¼ inch equals one foot. This is the scale generally used on plant installation work and on large construction jobs, such as buildings, railroads, bridges and the like. However, while the invention is particularly intended for the scale referred to, it should be borne in mind that its application to other scales will readily be understood by those skilled in the art, and therefore lies within the scope of the invention as disclosed herein.

The easy reading scale rule, in accordance with this invention, is characterized by a measuring means which starts from zero distance and works in accordance with a certain scale, such as ¼ inch equals one foot, and which has a stationary body from which a rotative shaft is accessible, the said shaft starting from zero position and turning in direct proportion to the distance which is being measured, and back to zero when said measuring means is reset to zero. It is proposed to use a stepped up indicator for said certain scale which has a casing from which its operative shaft is accessible, and said operative shaft also having a zero or starting position. The invention contemplates mounting this stepped up indicator upon the body of the measuring means, and contemplates connecting said shafts so that the indicator functions when the measuring means is worked. With this arrangement very small distances which are measured by the measuring means may be readily read upon the stepped up indicator.

The measuring means, in accordance with this invention, may assume various forms, designs and shapes. In one form of the invention it is proposed that the measuring means have the form of a ruler which may be placed upon a blueprint, drawing or other flat object which is to be scaled.

In another form of the invention it is proposed that the measuring means be in the form of a tape which may be extended across objects being measured.

The invention further contemplates characterizing the stepped up indicator by the fact that it is provided with two or more indicator dials which may be coaxially arranged, or arranged side by side, and which are geared together so as to represent various distances. For example, one of the dials may represent feet, another inches, and if desired, still another may represent tenths of an inch. Or, one dial may represent ten feet, another inches for each foot, and a third dial may represent one hundred feet, but divided into increments of ten feet each.

The invention contemplates novel means for mounting the stepped up indicator upon the measuring device, which novel means is characterized by the fact that the shafts of these two devices become connected and the scale rule is ready for immediate use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of an easy reading scale rule constructed in accordance with this invention.

Fig. 2 is an end elevational view looking from the right hand end of Fig. 1.

Fig. 3 is a fragmentary enlarged detailed view of the central portion of Fig. 1, with parts being broken away to disclose the interior construction.

Fig. 4 is a horizontal sectional view taken on the line 4—4 of Fig. 1.

Fig. 5 is a fragmentary enlarged vertical sectional view of the stepped up indicator taken on the line 5—5 of Fig. 4.

Fig. 6 is a fragmentary arcuate sectional view taken on the line 6—6 of Fig. 3.

Fig. 7 is a vertical sectional view taken on the line 7—7 of Fig. 1.

Fig. 8 is a perspective view of one of the racks used in the device.

Fig. 9 is a front elevational view of an easy reading scale rule constructed in accordance with another form of this invention.

Fig. 10 is a horizontal sectional view taken on the line 10—10 of Fig. 9.

Fig. 11 is a fragmentary vertical sectional view taken on the line 11—11 of Fig. 10.

Fig. 12 is a fragmentary vertical sectional view of the stepped up indicator taken on the line 12—12 of Fig. 10.

Figure 13:
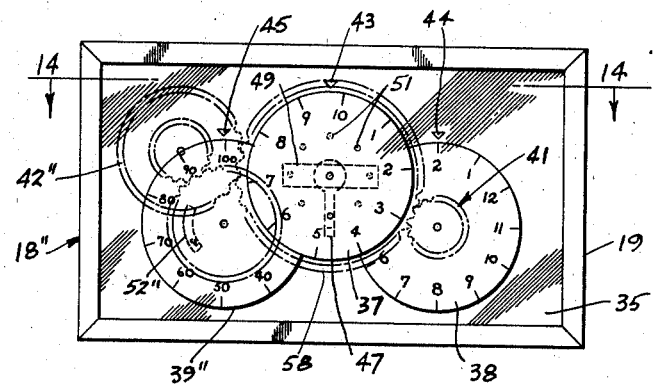
Fig. 13 is a front elevational view of a stepped up indicator embodying another form of this invention.

The easy reading scale rule illustrated in Figs. 1-8 inclusive, discloses one form of the invention and comprises a measuring means 15 which starts from zero distance and which works in accordance with a certain scale and which has a stationary body 16 from which a rotative shaft 17 is accessible. This shaft 17 starts from zero position and turns in direct proportion to the distance which is being measured, and turns back to zero when the measuring means is reset to zero. The easy reading scale rule also includes a stepped up indicator 18 for said certain scale and having a casing 19 from which a rotative operator shaft 20 is accessible. This operator shaft also has a zero or starting position. The stepped up indicator 18 is mounted on the measuring means 15 in such a way that the shafts 17 and 20 are connected with each other.

It should be clearly understood that the measuring means, in accordance with this invention, may take various forms. However, the particular form disclosed includes said body 16 which is of elongated flat form simulating a ruler. This body 16 is capable of being rested on a drawing or other flat object which is to be scaled. The shaft 17 is rotatively mounted in said body 16 and the accessible end extends through the front face of the body 16. A gear 21 is fixedly mounted on the shaft 17 and is located within the body 16. A pair of racks 22 and 23 engaged opposite sides of the gear 21 and extend from the ends of the body 16. These racks have handle portions 24 and 25, respectively at their extended ends by which the racks may be manually extended and retracted as desired. It should be noted that when the racks are thus moved the gear 21 will be turned in direct proportion to the distance that the racks are extended or retracted.

These racks 22 and 23 are provided with projecting pointers 26 and 27, respectively, which extend through a slot 28 formed in the top of the body 16. When the racks 22 and 23 are in their fully retracted positions these pointers 26 and 27 touch each other, as shown in Fig. 1. When the racks are extended the pointers 26 and 27 are moved apart, as indicated by the dot and dash lines in Fig. 1, which figure also schematically indicates extended positions of the racks.

Fig. 8 discloses the details of one of the racks. However, it should be understood that the racks are identical to each other, except for the location of the teeth thereof. The rack 22 is provided with teeth 28 located upon the bottom edge of an elongated opening 29 formed in the body of the rack. The rack 23 is similarly constructed except that it is provided with teeth 30 disposed along the top edge of the opening 31 of the rack. It is for this reason that the racks engage opposite sides of the gear 21, that is, the teeth 30 engage the top of the gear 21 while the teeth 28 engage the bottom. It is obvious that the gear 21 extends through the openings 29 and 31 of the said racks. The body 16 has a front wall 32 (see Fig. 7). Stationary guide strips 33 are mounted within the body 16 directly behind this front wall 32 and engage the top and bottom edge portions of the rack 23 for slidably supporting said racks.

The stepped up indicator 18 which is disclosed in the form of the invention shown in Figs. 1-8 includes the said casing 19 which has an open front wall closed by a sheet of transparent material 35, such as glass, etc. The casing 19 also has a transverse partition 36 spaced a short distance back from the transparent sheet 35. A plurality of indicator dials 37, 38 and 39 are located directly behind the transparent sheet 35 and to the front of the partition wall 36. The stepped up indicator has a main shaft 40 which is rotatively mounted through the partition 36. The dial 37 is mounted on the shaft 40 and represents the feet indicating dial of the indicator. Gear trains 41 and 42 extend between the said main shaft 40 and the indicator dials 38 and 39 for operating the latter dials in a certain proportion to the dial 37. The gear train 41 is so designed that the dial 38 makes a complete revolution for each foot indicated by the dial 37 and it is divided into twelve parts to indicate inches. The gear train 42 is so designed that the dial 39 makes one complete revolution for each inch on the dial 38. The dial 39 is calibrated to give tenths of an inch. Pointers 43, 44, and 45 are located on the transparent pane 35 and indicate the starting positions of the dials 37, 38 and 39, respectively.

The operator shaft 20 is rotative and depressible. It projects from the back wall of the casing 19. Transmission means connects the operator shaft 20 with the main shaft 40. This transmission means is shown in detail in Fig. 5. It includes a reduced end portion 46 on the inner end of the operator shaft 20, which reduced portion 46 is non-circular, preferably square, and which reduced portion 46 slidably engages a complementary socket formed in the end portion of the main shaft 40. A bearing 47 rotatively supports the latter end portion of the main shaft 40. This bearing 47 is supported on the back wall of the casing 19. Resilient means urges the operator shaft 20 outwards. This resilient means comprises an expansion spring 48 which is coaxially mounted around the inner end of the operator shaft 20 and which acts against the adjacent end of the main shaft 40. A member 49, such as a plate, is fixedly mounted on the operator shaft 20 and is provided with a plurality of projecting lock pins 50, which engage complementary keeper openings 51 located outwards of the pins 50. The construction is such that when the operator shaft 20 is pressed inwards the lock pins 50 will disengage from the keeper openings 51, freeing the operator shaft 20. The indicator is now ready to function.

Means is provided for limiting rotation of the slow moving indicator dial, that is, the dial 37 to an angular distance of 360°. This limiting means includes a stationary bracket 52 mounted on the back wall of the casing 19 and slidably supporting a pin 53 which extends from a limiting slot 54 formed in said bracket. The pin 53 is mounted on a block 55 which is slidable in an opening 56 in the bracket 52. A spring 57 urges the block 55 in one direction. The main shaft 40 is provided with a gear 58 which is common to the gear trains 41 and 42. This gear 58 has a projecting pin 59 which normally strikes against the bottom side pin 53, holding the pin in an elevated position when the dial 37 is at its zero position. However, when the dial 37 moves counter-clockwise in relation to the disclosure of Fig. 3, the pin 59 moves down from the pin 53 which then moves a short distance as permitted by the slot 54. The gear 58 may now turn 360° before the pin 59 will strike the top side of the pin 53. Since the gear 58 is directly mounted on the main shaft 40 which carries the dial 37, the latter can also turn through 360°.

The means for maintaining the indicator 18 on the body 16 of the measuring means 15 includes a pair of headed pins 60 and 61, preferably of different diameters, and mounted upon the back face of the body 19 of the stepped up indicator 18. These pins 60 and 61 engage complementary bayonet slots 62 and 63, respectively, formed in the front wall of the body 16 and arcuately of the shaft 17. The shaft 20 has a square end 64 which engages a complementary socket opening 65, see Fig. 4, formed in the exposed end of the shaft 17. When the indicator 18 is mounted upon the measuring means 15, as disclosed in Fig. 4, the operator shaft 20 is pressed inwards so that the spring 48 is contracted.

The operation of the device is as follows:

The easy reading scale rule may be placed on a drawing which is to be scaled. The racks 22 and 23 are extended by manually gripping the handles 24 and 25 and simultaneously forcing the handles apart. This separates the pointers 26 and 27 which are engaged across the distance to be measured. While the racks 22 and 23 were being extended, the gear 21 was turning in direct proportion, and the rotation from the gear 21 was transmitted by the shaft 17 to the operator shaft 20 of the stepped up indicator 18. Rotations of the shaft 20 were transmitted to the main shaft 40 of the indicator and then by the gear trains 41 and 42 to the dials 38 and 39 of the indicator. The scaled up distance may be read by reading the dials 37, 38 and 39 of the indicator 18.

When the racks 22 and 23 are pressed inwards back to their zero position the stepped up indicator 18 will be moved in reverse back to its zero position. When parts are in the latter position, the indicator 18 may be removed by turning it slightly to move the headed studs 60 and 61 to the large ends of the bayonet slots 62 and 63. Then the indicator 18 may be lifted from the measuring device. The spring 48 will immediately extend. The operator shaft 20 then moves out and the lock pins 50 will re-engage the keeper openings 51 locking the indicator in its zero position. Another indicator similar to the indicator 18, but working on a different scale, may then be mounted on the measuring device if this is desired.

In Figs. 9–12 inclusive a modified form of the invention has been disclosed which distinguishes from the prior form merely in the construction of the stepped up indicator 18'. The measuring means 15 in this form of the invention is identical to that of the prior form. The stepped up indicator 18' has a casing 19' which is provided with a front transparent sheet 35' behind which the indicator dials 37' and 38' are located. Directly behind these dials there is an opaque partition 36'. The indicator dials 37' and 38' are coaxially mounted. The dial 37' is mounted upon the main shaft 40' of the indicator. The dial 38' is mounted upon a tube 66 which is mounted on the main shaft 40'. The indicator also is provided with the operator shaft 20. This operator shaft is connected by a transmission 46' with the main shaft 40'. A gear train 41' connects the main shaft 40' with a tube 66 and thus with the dial 38'. A bracket 47' which is mounted upon the casing 19' rotatively supports the adjacent ends of the operator shaft 20 and main shaft 40'. The gear trains just referred to are so proportioned that the indicator dial 37' indicates feet and the dial 38' inches thereof. For this purpose there are pointers 43' and 44' imprinted upon the transparent sheet 35'.

In other respects this form of the invention is identical to the previous form and like parts are indicated by like reference numerals.

Figure 14:
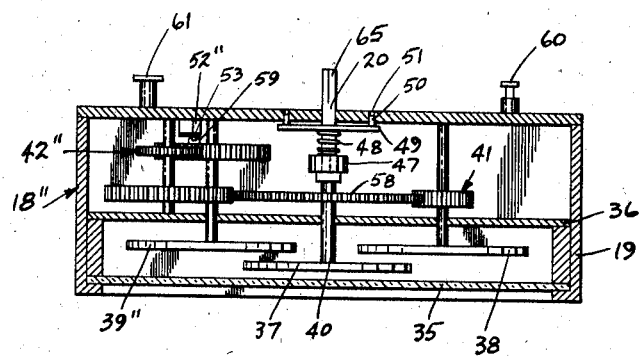
Fig. 14 is a horizontal sectional view taken on the line 14—14 of Fig. 13.

In Figs. 13 and 14 another stepped up indicator 18'' is illustrated which distinguishes from the indicator shown in the first disclosed form of the invention by the fact that the dial 39'' thereof is driven by a gear train 42'' which is connected with the dial 37 to cause the dial 39'' to rotate one-tenth of a revolution for each revolution of the dial 37. With this arrangement the dial 37 is calibrated to represent ten feet, and the dial 39'' is calibrated to represent 100 feet. The dial 39'' is calibrated in increments of ten feet each, so that it may be read for tens, while the dial 37 is read for feet. The dial 38 is calibrated for inches, as previously disclosed. With this construction the means for limiting rotation of the slow moving dial, which is the dial 39'', to an angular distance of 360° includes the stationary bracket 52'' which is provided with the resiliently supported pin 53 cooperative with the pin 59 which projects from that one of the gears of the gear train 42'' which is mounted on the same spindle as the dial 39''. In other respects this form of the invention is identical to the previous form and like parts are indicated by like reference numerals.

Figure 15:
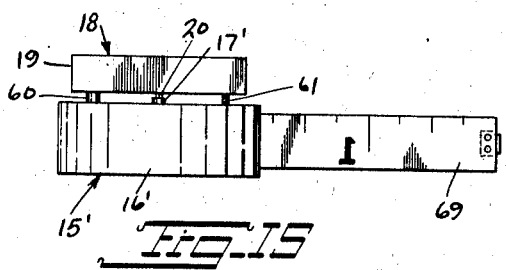
Fig. 15 is an edge view of an easy reading scale rule constructed in accordance with another form of the invention.

In Fig. 15 still another modified form of the invention is disclosed which distinguishes from the prior form in the measuring means 15'. This measuring means is of a construction so that the measuring may start at zero distance and work in accordance with a certain scale, as illustrated full size scale, and is provided with a stationary body 16' from which a rotative shaft 17' is accessible. This shaft 17' has a starting or zero position and turns in direct proportion to the distance which is being measured and turns back to zero when the measuring means is reset to zero.

The measuring means 15' is shown provided with an extendible inch tape 69 which may be used to measure the distance measured by said measuring means. The stepped up indicator 18 for said certain scale has a casing 19 from which the rotative operator shaft 20 projects. This operator shaft has a zero or starting position. The stepped up indicator 18 is provided with the headed pins 60 and 61 by which it is mounted on the body of the measuring means 15'.

In other respects this form of the invention is identical to the previous forms.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An easy reading scale rule and the like comprising a measuring means starting from zero distance and working in accordance with a certain scale and having a stationary body from which a rotative shaft is accessible, said shaft starting from zero position and turning in direct proportion to a distance which is being measured and back to zero when said measuring means is reset to zero, a "stepped up" indicator for said certain scale and having a casing and an accessible rotative operator shaft, said operator shaft having a zero or starting position, means for mounting said indicator on said body and connecting said shafts in their zero positions when said indicator is mounted on said body, comprising headed studs on said casing engaging bayonet slots on said body and a non-circular end portion on one of said shafts engaging a complementary opening on the other of the shafts.

2. An easy reading scale rule and the like comprising a measuring means starting from zero distance and working in accordance with a certain scale and having a stationary body from which a rotative shaft is accessible, said shaft starting from zero position and turning in direct proportion to a distance which is being measured and back to zero when said measuring means is reset to zero, a "stepped up" indicator for said certain scale and having a casing and an accessible rotative operator shaft, said operator shaft having a zero or starting position, means for mounting said indicator on said body and connecting said shafts in their zero positions when said indicator is mounted on said body, comprising headed studs on said casing engaging bayonet slots on said body and a non-circular end portion on one of said shafts engaging a complementary opening on the other of the shafts, said operator shaft being depressible, and resilient means urging it into an extended position.

3. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator for a certain scale and having a casing and an accessible rotative operator, said operator shaft being in a zero position when said indicator is at zero, and means for mounting said indicator on said body and connecting said shafts in their zero positions when said indicator is mounted on said body.

4. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator having a casing and an accessible rotative operator, said operator shaft being in a zero position when said indicator is at zero, and means for mounting said indicator on said body and connecting said shafts in their zero positions when said indicator is mounted on said body, said racks being provided with elongated openings into which said gear extends, and the teeth of the racks being on opposite sides of said openings.

5. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator having a casing and an accessible rotative operator, said operator shaft being in a zero position when said indicator is at zero, and means for mounting said indicator on said body and connecting said shafts in their zero positions when said indicator is mounted on said body, comprising headed pins on said casing engaging bayonet slots in said body and a non-circular end portion on one of said shafts engaging a complementary opening on the other of said shafts.

6. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator having a casing and an accessible rotative operator, said operator shaft being in a zero position when said indicator is at zero, and means for mounting said indicator on said body and connecting said shafts in their zero positions when said indicator is mounted on said body, and means for locking said indicator from working except when it is mounted on said body.

7. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator having a casing and an accessible rotative operator, said operator shaft being in a zero position when said indicator is at zero, and means for mounting said indicator on said body and connecting said shafts in their zero positions when said indicator is mounted on said body, and means for locking said indicator from working except when it is mounted on said body, comprising a member mounted on the operator shaft and having lock pins engaging keeper openings.

8. An easy reading scale rule and the like comprising an elongated flat body for resting on a drawing or other flat object which is to be scaled, a shaft rotatively mounted in said body and having one end accessible from the front of said body, a gear on said shaft, a pair of racks engaging opposite sides of said gear and extending from the ends of said body by which they may be extended and retracted to turn said gear and shaft, pointers on said racks and projecting from said body and engaging each other when said racks are fully retracted in which said shaft is in a zero position, a "stepped up" indicator having a casing and an accessible rotative operator, said operator shaft being in a zero position when said indicator is at zero, and means for mounting said indicator on said body and connecting said shafts in their zero positions when said indicator is mounted on said body, and means for locking said indicator from working except when it is mounted on said body, comprising a member mounted on the operator shaft and having lock pins engaging keeper openings, said operator shaft being depressible to disengage the lock pins from the keeper openings.

9. A step up indicator for an easy reading scale rule, and the like, comprising a casing for the indicator, a main shaft rotative in said casing, a plurality of indicator dials, gear trains from the main shaft for operating said dials, a rotative and depressible operator shaft for said indicator and accessible through said casing, transmission means connecting said operator and main shafts, resilient means urging said operator shaft outwards, and a member mounted on said operator shaft and having lock pins, a keeper forwards of said lock pins, and said lock pins being disengageable from said keeper when said operator shaft is depressed.

10. A step up indicator for an easy reading scale rule, and the like, comprising a casing for the indicator, a main shaft rotative in said casing, a plurality of indicator dials, gear trains from the main shaft for operating said dials, a rotative and depressible operator shaft for said indicator and accessible through said casing, transmission means connecting said operator and main shafts, resilient means urging said operator shaft outwards, a member mounted on said operator shaft and having lock pins, a keeper forwards of said lock pins, and said lock pins being disengageable from said keeper when said operator shaft is depressed, and means for limiting rotation of the slow moving indicator dial to 360 degrees.

11. A step up indicator for an easy reading scale rule, and the like, comprising a casing for the indicator, a main shaft rotative in said casing, a plurality of indicator dials, gear trains from the main shaft for operating said dials, a rotative and depressible operator shaft for said indicator and accessible through said casing, transmission means connecting said operator and main shafts, resilient means urging said operator shaft outwards, a member mounted on said operator shaft and having lock pins, a keeper forwards of said lock pins, and said lock pins being disengageable from said keeper when said operator shaft is depressed, and means for limiting rotation of the slow moving indicator dial to 360 degrees, comprising a pin movably mounted through a limiting slot, and a complementary pin on one of the gears of said gear trains engageable with one or the other of the sides of said pin.

JOHN B. HANDLEY.